Patented May 12, 1925.

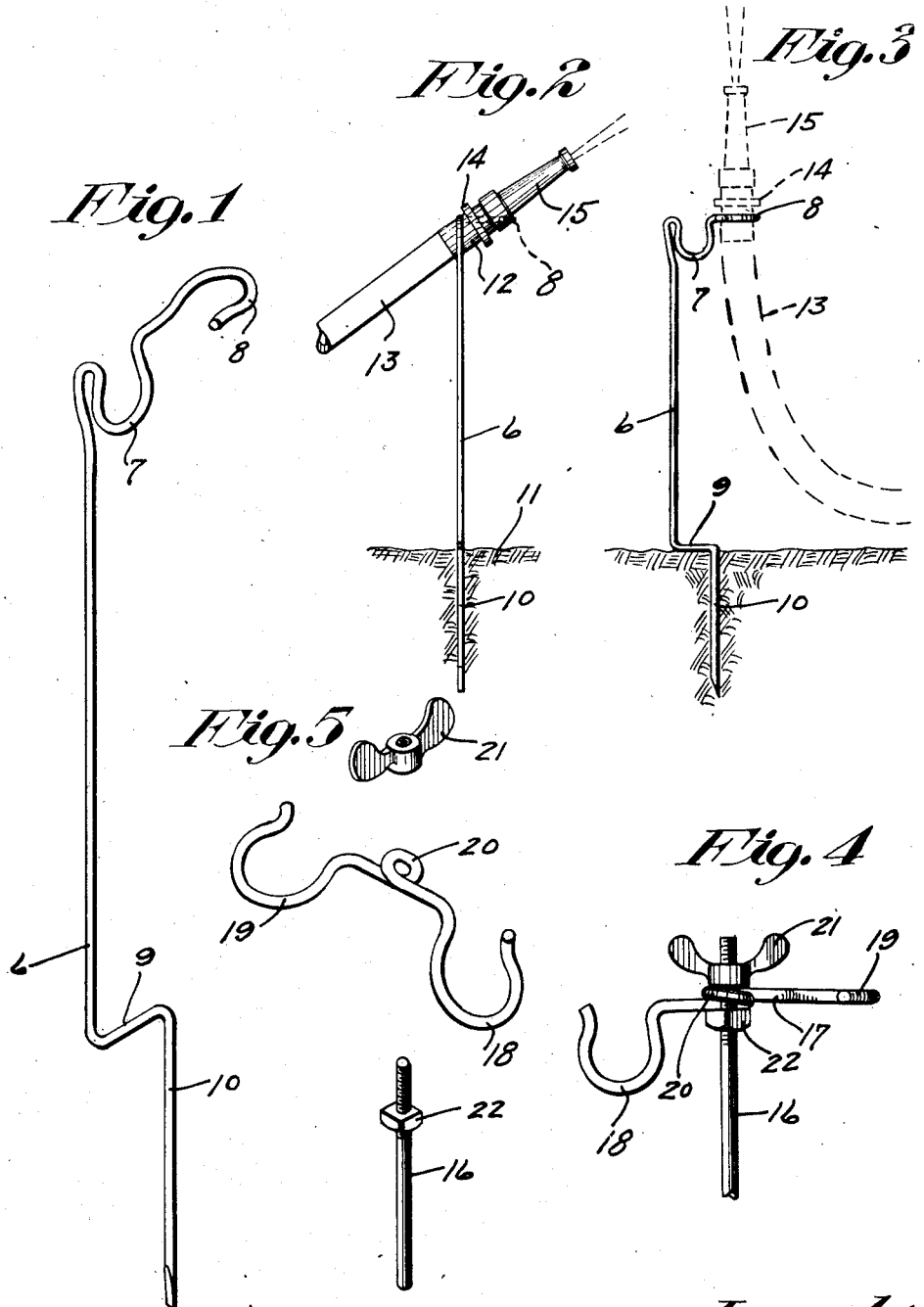

1,537,237

UNITED STATES PATENT OFFICE.

JOHN D. KAESTNER, OF MINNEAPOLIS, MINNESOTA.

NOZZLE HOLDER.

Application filed March 5, 1924. Serial No. 697,011.

*To all whom it may concern:*

Be it known that I, JOHN D. KAESTNER, a citizen of the United States, residing at Minneapolis, in the county of Hennepin and State of Minnesota, have invented certain new and useful Improvements in Nozzle Holders; and I do hereby declare the following to be a full, clear, and exact description of the invention, such as will enable others skilled in the art to which it appertains to make and use the same.

My present invention has for its object to provide an extremely simple and highly efficient nozzle holder, and to this end it consists of the novel devices and combinations of devices hereinafter described and defined in the claim.

In the accompanying drawings, which illustrate the invention, like characters indicate like parts throughout the several views.

Referring to the drawings:

Fig. 1 is a perspective view of the nozzle holder;

Fig. 2 is a side elevation of the same held in an upright position by having its prong pressed into the ground, and holding in one of its clips the nozzle of a garden hose:

Fig. 3 is a rear elevation of the nozzle holder, as shown in Fig. 2, and illustrating the hose by means of broken lines, and with its nozzle held in an upright position;

Fig. 4 is a fragmentary view showing a slight modification of the nozzle holder; and Fig. 5 is a perspective view of the parts shown in Fig. 4 separated the one from the other.

Referring first to the invention as illustrated in Figs. 1, 2 and 3, the same is formed from a single rod and includes a standard 6, the upper end portion of which is bent to form two independent nozzle-holding clips 7 and 8, the former of which is located close to the standard 6 and in substantially the same vertical plane therewith, and the latter of which is located outward of the clip 7 and extends substantially in a horizontal plane. The lower end portion of the standard 6 is bent laterally to afford a horizontal offset portion 9, and the rod at the outer end of said offset portion is bent downward to afford a depending prong 10, the lower end of which is sharpened and adapted to be pressed into the ground 11, as indicated in Figs. 2 and 3.

The clips 7 and 8 are U-shaped and the prongs thereof are in converging relation, and either of said clips is adapted to receive the coupling 12 on the outer end of a garden hose 13. A nozzle 15 is secured in the coupling 12, and a flange 14 on said coupling prevents backward movement of said coupling in the respective clip.

It will be noted that the clips 7 and 8 are more than semi-circles so that their converging prongs spring apart when the coupling 12 is inserted therein and then close on said coupling to securely hold the same against lateral movement therefrom. When the coupling 12 is inserted into the clip 7, the nozzle 14 is held in an oblique position, as indicated in Fig. 2, and when said coupling is inserted into the clip 8, the nozzle is held in an upright position, as indicated by broken lines in Fig. 3.

Obviously, the prong 10 will securely hold the standard in an upright position, and said standard may be moved in a complete circle by causing said prong to turn in the ground, and thereby give a wide range to the spraying action of the hose. The offset portion 9 affords a foot rest by which the prong 10 may be pressed into the ground, and further, said offset portion, by its engagement in the ground, affords an anchor to hold the prong 10 from turning in the ground, and thereby keeps the standard in a predetermined or set position.

Referring now to the invention as illustrated in Figs. 4 and 5, the standard 16 is provided with a transverse head 17, the end portions of which are bent to afford nozzle-holding clips 18 and 19. To secure the head 17 to the rod 16, the same is bent at its intermediate portion to form an eye 20 to receive the upper end of the standard 16, and said head at the eye 20 is securely clamped between upper and lower nuts 21 and 22, that have screw-threaded engagement with the standard 16, and the former of said nuts is provided with wings by which it may be turned

What I claim is:

A nozzle-holder formed from a single rod and comprising a standard, the lower end of which is adapted to be pressed into the ground, the upper edge portion of said standard being folded upon itself and then outward and upward in a plane that radiates from the standard to form a U-shaped clip the arms of which extend upward in said plane and from thence said rod extends horizontally outward to form an arm, the free end portion of which is bent laterally and rearward in a horizontal plane to form a second U-shaped clip the arms of which extend toward said standard in said horizontal plane.

In testimony whereof I affix my signature.

JOHN D. KAESTNER.